United States Patent
Holenstein et al.

(10) Patent No.: US 11,748,212 B1
(45) Date of Patent: Sep. 5, 2023

(54) METHOD AND APPARATUS FOR RESOLVING AUTOMATIC TRANSACTION FACILITY (ATF) FAILURES

(71) Applicant: Gravic, Inc., Malvern, PA (US)

(72) Inventors: Bruce D. Holenstein, Media, PA (US); Paul J. Holenstein, Downingtown, PA (US); Keith B. Evans, Santa Rosa, CA (US); Dylan R. Holenstein, Media, PA (US)

(73) Assignee: GRAVIC, INC., Malvern, PA (US)

( * ) Notice: Subject to any disclaimer, the term of this patent is extended or adjusted under 35 U.S.C. 154(b) by 40 days.

(21) Appl. No.: 17/360,374

(22) Filed: Jun. 28, 2021

(51) Int. Cl.
*G06F 11/00* (2006.01)
*G06F 11/14* (2006.01)
*G06F 16/23* (2019.01)

(52) U.S. Cl.
CPC ...... *G06F 11/1469* (2013.01); *G06F 16/2365* (2019.01); *G06F 2201/84* (2013.01)

(58) Field of Classification Search
CPC ............ G06F 11/1469; G06F 16/2365; G06F 2201/84
See application file for complete search history.

(56) References Cited

U.S. PATENT DOCUMENTS

| | | | |
|---|---|---|---|
| 4,868,744 A * | 9/1989 | Reinsch | G06F 11/141 |
| | | | 714/E11.13 |
| 5,799,305 A | 8/1998 | Bortvedt et al. | |
| 7,200,777 B1 * | 4/2007 | Bouchee | G06F 11/1469 |
| | | | 714/45 |
| 7,246,123 B2 | 7/2007 | Carr et al. | |
| 7,415,466 B2 * | 8/2008 | Ganesh | G06F 11/1471 |
| 7,617,212 B2 * | 11/2009 | Faller | G06F 16/2343 |
| | | | 707/999.009 |
| 8,903,779 B1 | 12/2014 | Holenstein et al. | |

(Continued)

OTHER PUBLICATIONS

Richard Carr, "Best Practices: Using TMF to Implement Business Continuity/Disaster Recovery," Carr Scott Software Inc., The Connection, vol. 34, No. 5, pp. 26-29 (Sep.-Oct. 2013).

(Continued)

*Primary Examiner* — Loan L. T. Truong
(74) *Attorney, Agent, or Firm* — Clark A. Jablon

(57) ABSTRACT

An automated method is provided for resolving an unintended transaction rollback in a system that includes an audited database, a non-audited application, and a facility for converting non-audited applications to use audited database transactions, wherein the unintended transaction rollback is the result of a failure of the facility to convert the unintended transaction rollback to a commit operation, The non-audited application is operated with the facility creating database transactions against the audited database. The database transactions include one or more transaction steps or operations. The created database transactions are monitored to detect transaction rollbacks. A determination is made when a detected transaction rollback for a database transaction is an unintended transaction rollback. The one or more transaction steps or operations of the database transaction that included the unintended transaction rollback are recovered in the audited database. The recovering resolves the unintended transaction rollback.

9 Claims, 7 Drawing Sheets

ATF Fixer Engine Reads Audit Trail

(56) References Cited

U.S. PATENT DOCUMENTS

| | | | | |
|---|---|---|---|---|
| 8,909,604 | B1* | 12/2014 | Holenstein | G06F 11/1471 |
| | | | | 707/678 |
| 9,804,935 | B1 | 10/2017 | Holenstein et al. | |
| 9,830,223 | B1* | 11/2017 | Holenstein | G06F 11/1474 |
| 2004/0133591 | A1* | 7/2004 | Holenstein | G06F 11/2079 |
| | | | | 707/999.102 |
| 2005/0102250 | A1* | 5/2005 | Carr | G06F 9/466 |
| 2005/0131966 | A1* | 6/2005 | Lou | G06F 16/2308 |
| 2008/0162990 | A1* | 7/2008 | Wang | G06F 11/1407 |
| | | | | 714/19 |
| 2009/0313311 | A1* | 12/2009 | Hoffmann | G06F 11/2097 |
| 2013/0036136 | A1* | 2/2013 | Horii | G06F 16/2308 |
| | | | | 707/E17.014 |
| 2014/0089267 | A1* | 3/2014 | Yoshida | G06F 16/10 |
| | | | | 707/684 |
| 2014/0250085 | A1* | 9/2014 | Sorenson | G06F 16/2322 |
| | | | | 707/684 |
| 2015/0205850 | A1* | 7/2015 | Lu | G06F 16/2358 |
| | | | | 707/615 |
| 2016/0283331 | A1* | 9/2016 | Barber | G06F 11/1471 |
| 2018/0260427 | A1* | 9/2018 | Khadiwala | G06F 16/27 |
| 2018/0322156 | A1* | 11/2018 | Lee | G06F 16/23 |
| 2019/0079965 | A1* | 3/2019 | Pareek | G06F 16/1865 |
| 2019/0228086 | A1* | 7/2019 | Bordens | G06F 21/62 |
| 2021/0200611 | A1* | 7/2021 | Barnum | G06F 11/3644 |

OTHER PUBLICATIONS

"TMF-Audit Toolkit," from TANDsoft Inc. (https://tandsoft.com/files/products/TMF-Audit-Toolkit.html, accessed Apr. 28, 2021), 1 page.

* cited by examiner

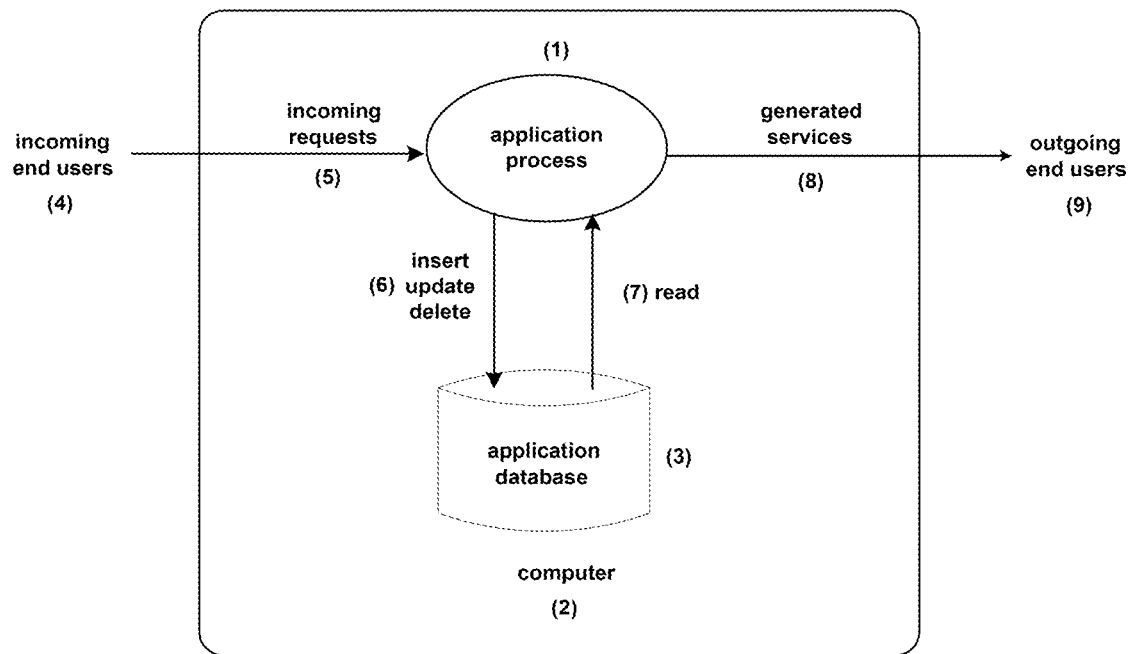
Figure 1: Prior Art - A Computer Application
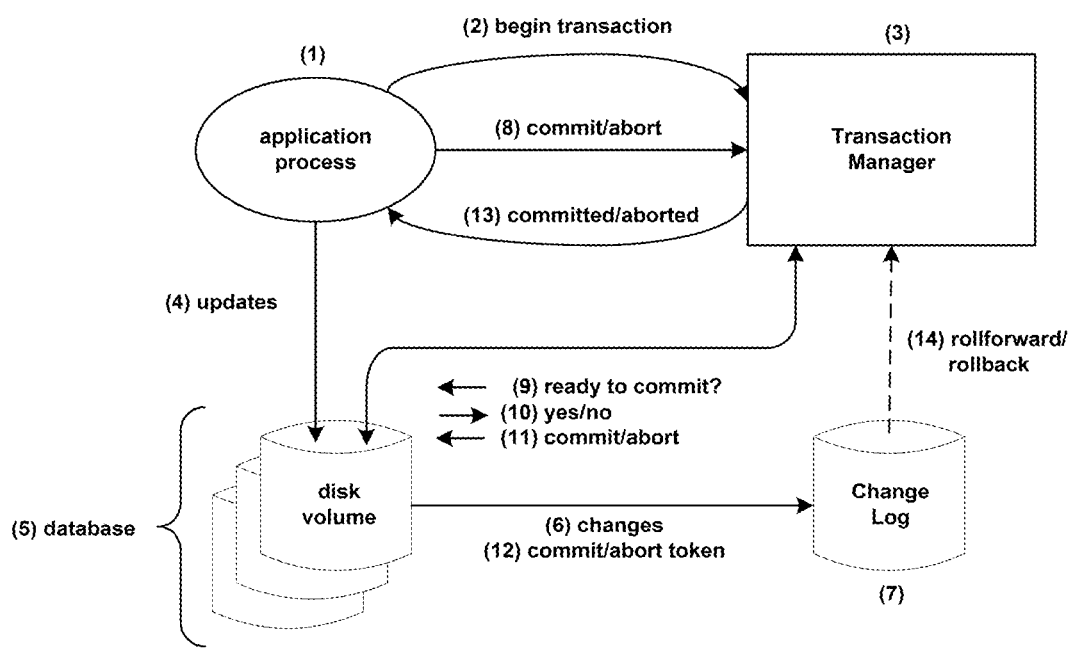
Figure 2: Prior Art - Transaction Manager

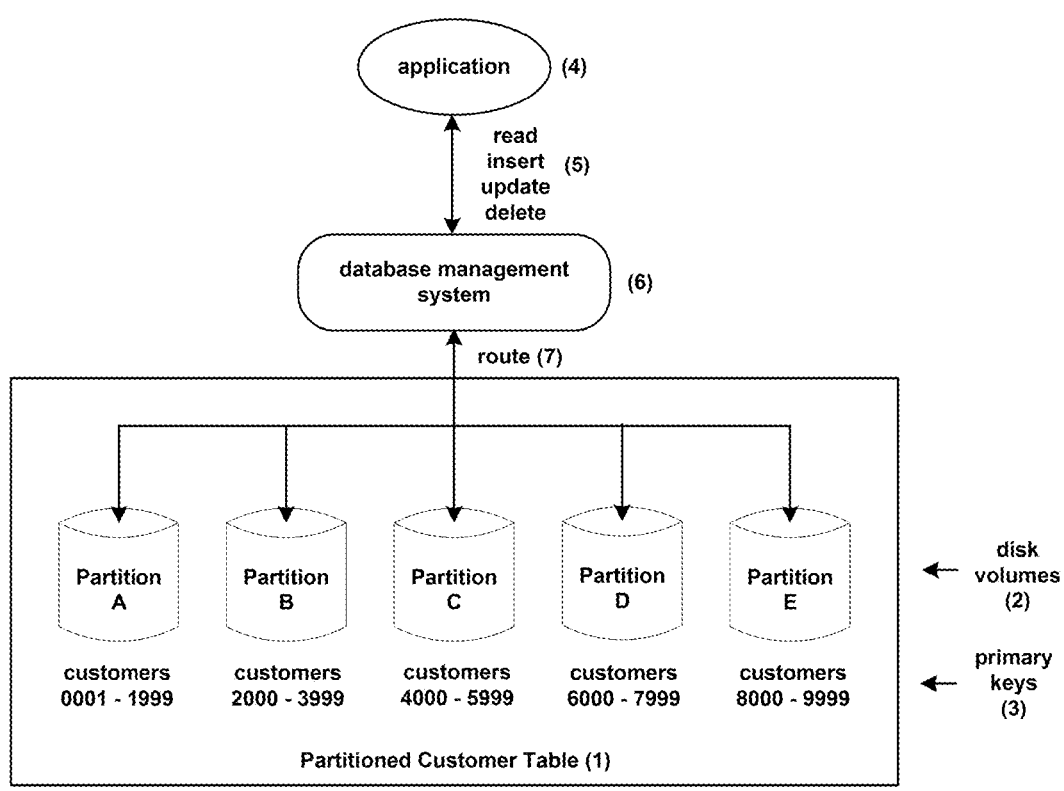
Figure 3: Prior Art - Table Partitioning

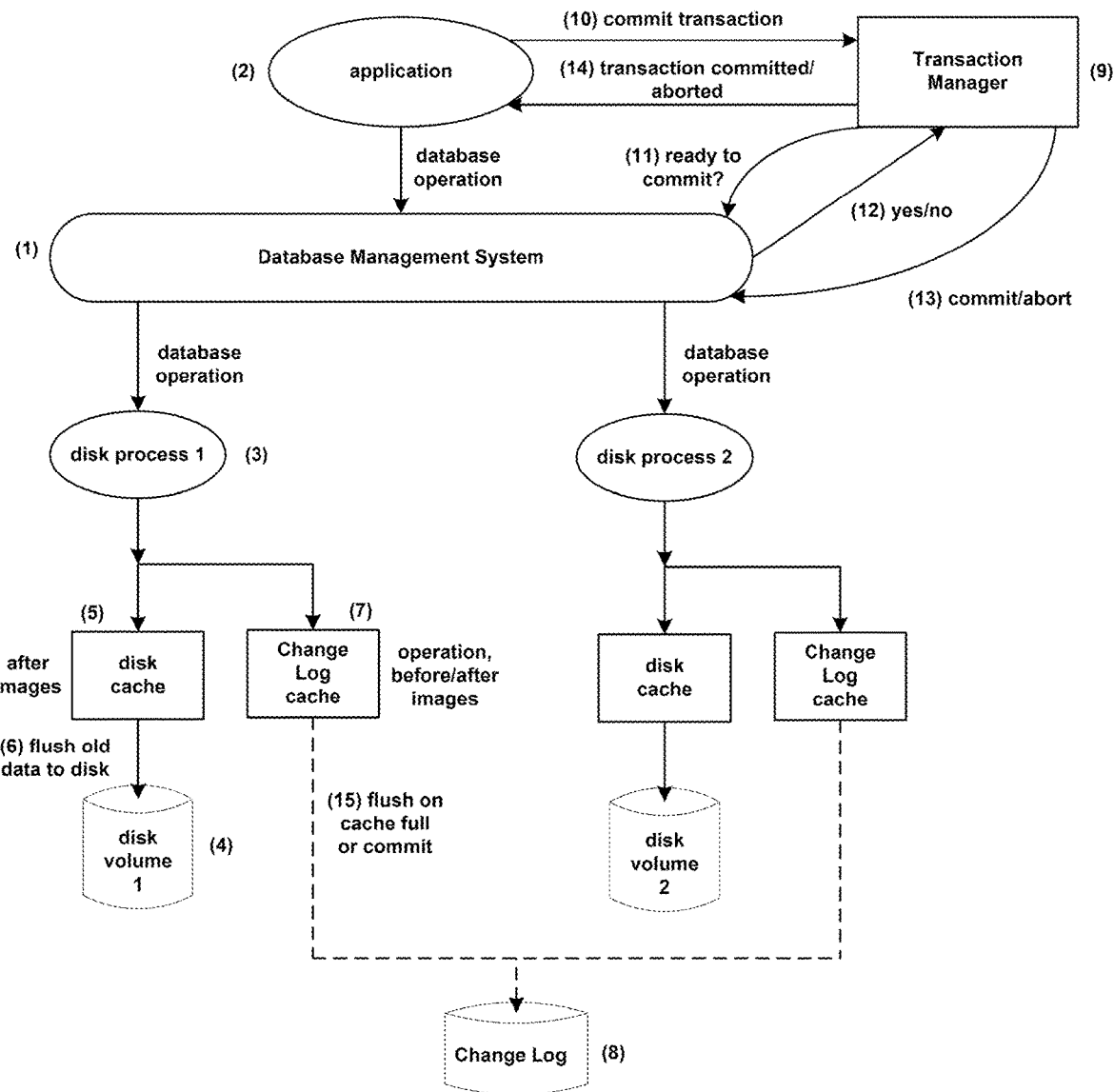
Figure 4: Prior Art - Enhancing Database Performance with Multithreaded Parallelism

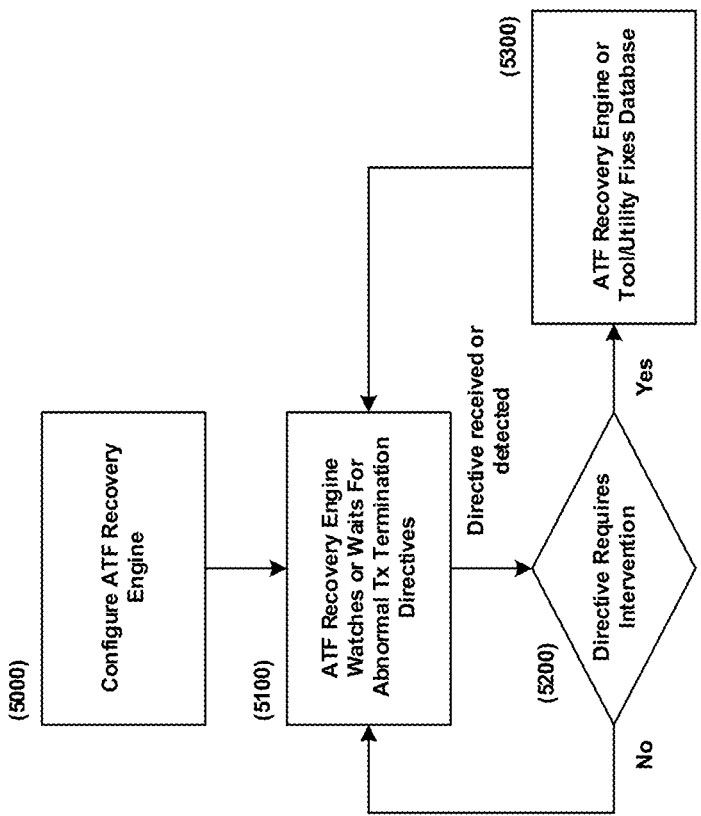
Figure 5: ATF Recovery Engine Watches or Waits for Abnormal Termination

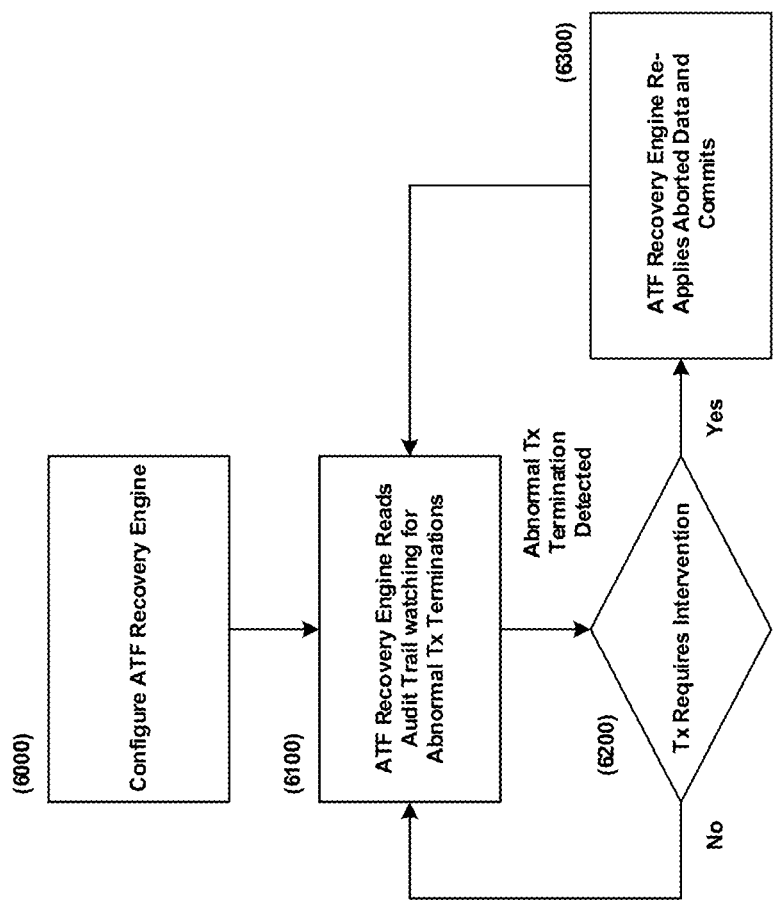
Figure 6: ATF Fixer Engine Reads Audit Trail

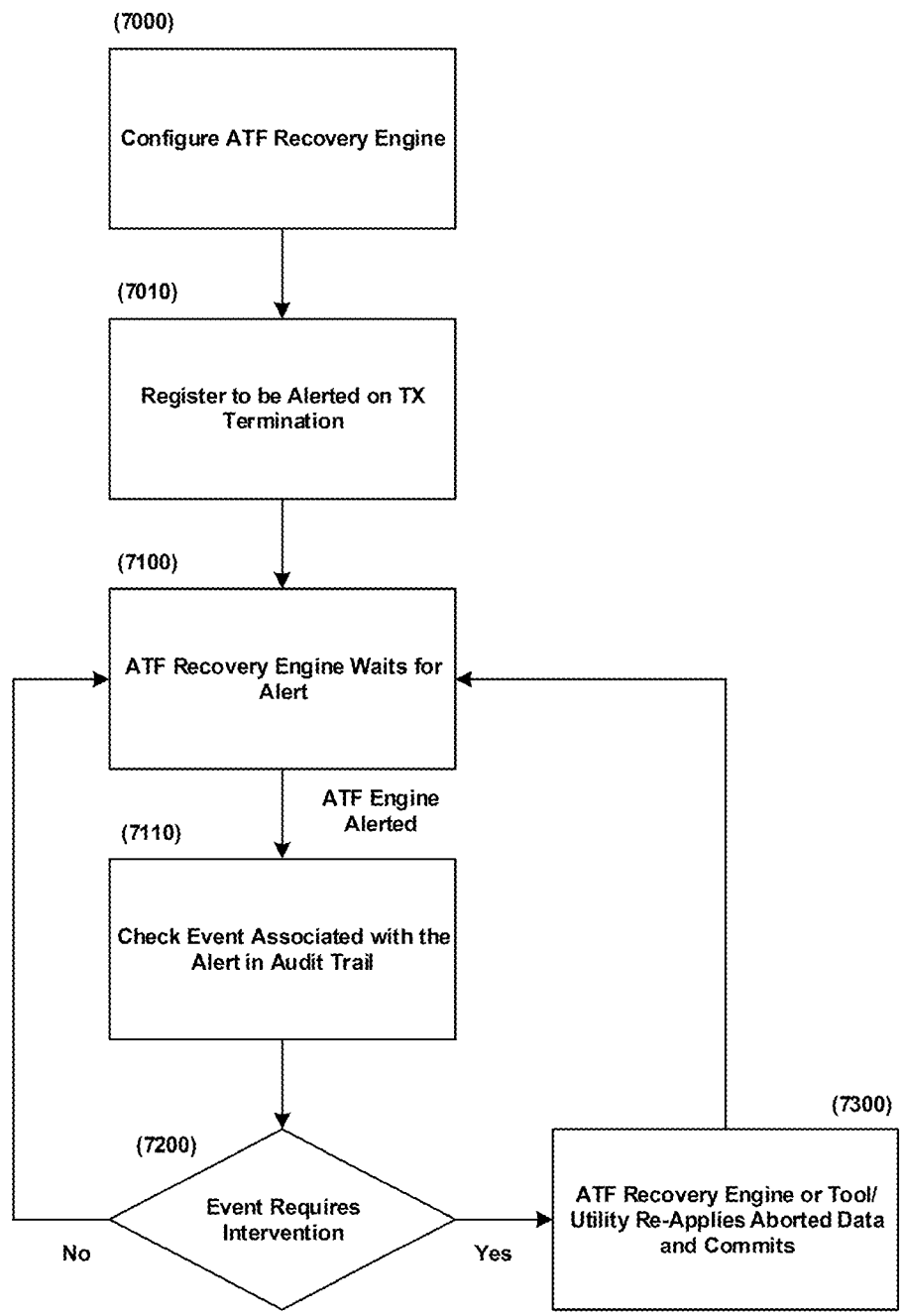
Figure 7: ATF Recovery Engine Waits for Alerts and Re-Applies Aborted Data

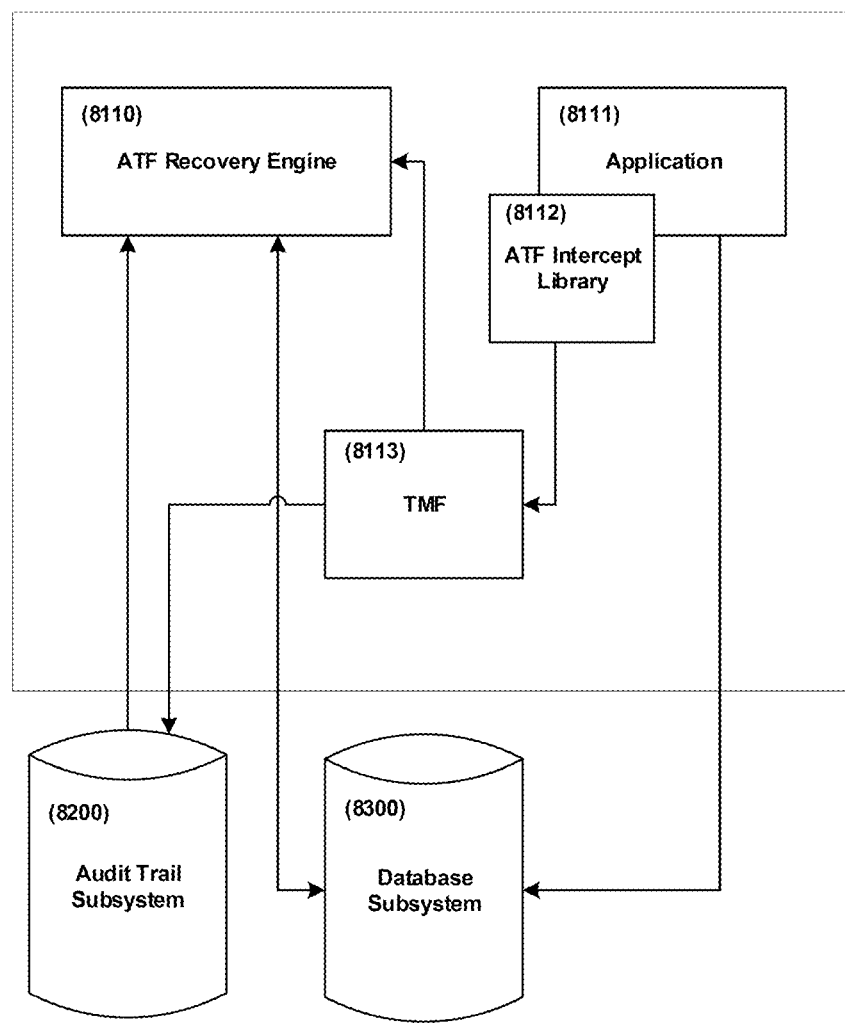
Figure 8: System including ATF Recovery Engine

METHOD AND APPARATUS FOR RESOLVING AUTOMATIC TRANSACTION FACILITY (ATF) FAILURES

BACKGROUND OF THE INVENTION

Certain terms used in the following sections are defined in Section 3, "Definitions."

1 Background

1.1 Computer Applications

Much of our daily life is augmented by computers. The many services upon which we depend, our banking, communications, air and rail travel, online shopping, credit-card and debit-card purchases, mail and package delivery, and electric-power distribution, are all managed by computer applications.

1.1.1 Processes

In its simplest form, as shown in FIG. 1, a typical computer application is implemented as a computer program (1) running in a computer (2). A computer program is basically a set of computer-encoded instructions, often called an executable because it can be executed by a computer. A computer program running in a computer is called a process, and each process has a unique identification known to the computer. Many copies of the same computer program can be running in a computer as separately distinguishable processes.

An application typically includes multiple interacting processes.

1.1.2 Application Database

Referring to FIG. 1, in many cases an application depends upon a database (3) of information that the application maintains to record its current state. Often, the information in the database is fundamental to the operation of the application, to the decisions it makes, and to its delivery of services to end users.

The database may be stored in persistent storage such as a disk for durability, it may be stored in high-speed memory for performance, or it may use a combination of these storage techniques. The database may be resident in the same computer as the application program, it may be resident in another computer, it may be implemented as an independent system, or it may be distributed among many systems.

A database generally includes one or more files or tables, though it may be just a random collection of unorganized data. Each file or table typically represents an entity set such as "employees" or "credit cards." A file comprises records, each describing a member of an entity set, such as an employee. A table comprises rows that describe members of an entity set. A record comprises fields that describe attributes of the entity set, such as salary. A row comprises columns that describe attributes of the entity set. In this specification, "files" are equivalent to "tables;" "records" are equivalent to "rows;" and "fields" are equivalent to "columns."

1.1.3 Request Processing

With further reference to FIG. 1, incoming end users (4) generate requests (5) to be processed by the computer application. End users may be people, other computer applications, other computer systems, or electronic devices such as electric power meters. In this specification, the term "end user" means any entity that can influence an application and/or can use the services that the application provides.

As part of the processing of a request, the application may make certain modifications to its database (6). It can insert rows, update rows, and delete rows. The application can read the contents of rows in its database (7). It may read certain information from its database to make decisions. Based on the request it received from an incoming end user and the data in its database, the application will deliver certain services (8) to its outgoing end users (9).

1.2 Transactions

In many applications, changes to the database, i.e., inserts, updates, deletes, or changes to the database structure, are organized as transactions. A transaction is a delimited set of changes that either must all be made to a database or sent to an application, or else none are. For instance, a transaction in a banking application may transfer funds from one account to another. The transaction applies a debit to one account (a reduction in its value) and an equal credit to another account (an increase in its value). Either both of these updates must occur or neither must occur in order to keep the customer's accounts balanced.

1.2.1 The ACID Properties of Transactions

Transactions typically exhibit ACID properties—Atomicity, Consistency, Isolation, and Durability:

Atomicity means that either all changes contained within the transaction are executed against the database or that none are.

Consistency means that at any time, the view of the database represents an accurate view of the application data.

Isolation means that a transaction is unaffected by other transactions that are executing simultaneously.

Durability means that the resulting modification to the database by a transaction will survive any subsequent system failures.

In some implementations, the ACID properties may be relaxed. For instance, the attributes of consistency and isolation may be traded for performance. Eventual consistency may be used in which the database will achieve consistency after a period of time.

The changes comprising a transaction are delimited by a pair of directives. The beginning of a transaction is identified by a Begin Transaction directive (in some systems, the Begin Transaction directive is implied by the first operation of a new transaction). The conclusion of a transaction is either a Commit Transaction directive or an Abort Transaction directive. A Commit Transaction directive causes all of the changes within the transaction to be applied to the database and to be durable. An Abort Transaction directive causes the changes within the transaction to be discarded. Though the terms Begin Transaction, Commit Transaction, and Abort Transaction are used in this specification, they are often known by different terms in different systems. However, the actions they denote are substantially the same in all systems.

A typical transaction appears as follows:
Begin Transaction
Insert Row A
Read Row B
Update Row B
Delete Row C
Commit Transaction

1.2.2 Transaction Manager

A transaction may span and modify several resources. The most common resource is a disk volume, though there may be other resources such as a synchronous replication engine. A database may be spread across several disk volumes, each a separate resource. Before a transaction can be committed, all resources must agree that they have received all of their changes and that they have safe-stored them or applied them to their portions of the database. If all resources can commit their changes, the transaction is committed; and the changes are made to the resources. If any resource cannot commit its changes, the transaction is aborted; and no changes are made to the database. This ensures the attribute of atomicity—either all changes within the bounds of the transaction are applied to the database, or none are.

Coordinating the commit of a transaction is the job of the Transaction Manager, as shown in FIG. 2. When an application (1) wishes to begin a transaction, it makes a request (2) to the Transaction Manager (3). The application then applies the changes (4) bounded by the transaction to its application database (5). As each change is made, its before and/or after images are written (6) to a Change Log (7).

When the application has completed the database changes for the transaction, it sends a commit request (8) to the Transaction Manager. The Transaction Manager next asks each resource involved in the transaction (typically, the disk volumes that had been involved in the transaction) if it is ready to commit (9). If all resources respond positively (10), the Transaction Manager instructs them to commit the transaction (11). It will write a commit token to the Change Log (12) and will inform the application that the transaction has been committed (13).

If any resource responds that it cannot make the changes to its database (10), the Transaction Manager informs all databases and resources to abort the transaction (11). No changes will be made to the databases, and all locks will be released. An abort token typically is written to the Change Log (12), and the application is informed that its transaction has been aborted (13). The application can also request that the Transaction Manager abort the transaction (8) rather than ask the Transaction Manager to commit the transaction.

The Transaction Manager typically uses the Change Log (7) to correct corruption to the database. It uses the before images stored with each change to roll back data objects to their original values if they have been erroneously changed. It uses the after images in the Change Log to roll forward data objects whose changes have become lost due to a system malfunction (14).

1.3 Database Management System (DBMS)

A Database Management System (DBMS) is a suite of computer software that provides the interface between applications and the database or databases that the application is using. The services that a DBMS provides, among others, include:

Defining the structure of the database and subsequently modifying it via DDL (data definition language) commands. The structure includes the tables in the database, the columns that make up each table, and the definition of primary keys, alternate keys (including unique attributes), and foreign keys.

Retrieving data from the database.

Changing the contents of the database via insert, update, and delete commands issued to the DBMS by applications via DML (data manipulation language) commands.

Ensuring that relational constraints are followed and rejecting any change that violates a relational constraint.

Recording all changes to the database in the Change Log.

1.3.1 Relational Constraint Checking

Different DBMS's take different approaches to relational constraint checking. Some do no relational constraint checking at all. Others check relational constraints only at commit time and abort the transaction if it has violated a relational constraint. Still others check relational constraints on each database change and either return an I/O error indicating the I/O failed, or immediately abort the transaction if a relational constraint is detected.

For those DBMSs that do relational constraint checking on each database change and auto-abort on a violation, the replication engine must check that each change does not violate a relational constraint before passing it to the DBMS. If it does violate a relational constraint (that will cause an auto-abort), it must be set aside for later processing.

1.3.2 Partitioning

In many large applications, the size of a table may exceed the size of a disk volume in the computer's disk farm. In this case, the table is partitioned across several disk volumes or even systems. The table is broken into sections, or partitions, typically organized by ranges of its primary key. Each partition is assigned to a different disk volume.

FIG. 3 shows a large Customer Table (1) partitioned across five disk volumes (2). The table is partitioned according to customer identification number, which is the primary key in the table (3). Customers 0001 to 1999 are assigned to Partition A, customers 2000 to 3999 are assigned to Partition B, and so on. Each partition is stored on its own disk volume.

When the application (4) makes a database request (5) for an operation on the Customer Table, the request is handled by the system's Database Manager (6). The Database Manager is aware of the partitioning and routes the database request to the appropriate disk volume for execution (7).

1.3.3 Database Parallelism

The capacity of large applications with significant database activity can be markedly improved by performing multiple operations in parallel. Rather than making one database change at a time, the DBMS is capable of performing multiple operations simultaneously. Since any one particular database disk typically can undertake only one operation at a time, database parallelism requires operations to be performed simultaneously over multiple disks.

Examples of highly parallel DBMSs are the HPE NonStop SQL database manager and the HPE NonStop Enscribe database manager. The following explanation of database parallelism is based in part on these DBMSs. Though there are other implementations of highly parallel DBMSs, many exhibit the same properties that are the subject of this invention. Such an example is Oracle RAC (Real Application Clusters) that allows several computing systems to simultaneously access a common database.

1.3.3.1 Parallel Database Access Paths

FIG. 4 illustrates a parallelized DBMS. It has available to it a number of disk volumes, each controlled by its own disk process. The DBMS is aware of the structure of the database and knows on which volumes the tables or their partitions are located. Though FIG. 4 shows only two volumes, large systems may have hundreds of disk volumes, each managed by its own disk process.

When the DBMS (1) receives a database operation request from an application (2) (such as a read, insert, update, or delete operation), it determines which disk process (3) is managing the disk volume (4) upon which the operation is to be executed. It passes that request to the corresponding disk process. Consequently, the DBMS can have multiple database operations executing simultaneously, one or more for each disk volume. Even more so, the DBMS can have multiple database operations executing simultaneously over multiple threads or processing paths.

1.3.3.2 Disk Cache

For performance purposes, the disk process often operates on database rows that are cached in high-speed memory. Each disk volume has its own disk cache (5). The disk cache holds the latest rows that have been accessed. If the operation is a read, the disk process looks to see if the row to be read is resident in disk cache and, if so, returns the row to the application. If the row is not in the disk cache, the disk process will read it from disk, will store it in the disk cache, and will return the row to the application.

If the operation is an insert, the new row is inserted into the disk cache. If it is an update, the disk process checks to see if the row is in cache. It so, it updates the cache-resident copy. If not, it reads the row from disk into cache and then updates the cached copy. If the operation is a delete, the disk process marks that row as deleted in cache or physically removes it from cache. Depending upon the size of the disk cache and the distribution of data in the database, having access to data in high-speed memory rather than having to access it from the relatively slow disks greatly speeds the database operations.

If a row must be entered into cache, but the cache is full, most DBMSs use a Least-Recently-Used (LRU) algorithm to write rows or blocks of rows to disk. The disk process will determine which rows in the cache are the oldest (that is, they have not been accessed for the longest period of time) and will write them to disk (6), thus freeing cache space for new rows.

1.3.3.3 The Change Log

Referring to FIG. 4, the DBMS maintains a log of all changes made to the database (the Change Log). Again, each disk process typically has a Change Log cache (7); although in some implementations, a combined cache is used. Whenever a row is modified, the disk process will store the operation performed on the row and the before and/or after images of the changed row in the Change Log cache. The before image of an insert is null; its after image is the inserted row. The before image of an update is the original row to be updated; its after image is the new row. The before image of a delete is the row that is to be deleted; its after image is null. Should the Change Log cache become full, or should some other DBMS event occur such as a transaction commit operation or the expiration of a timeout, the Change Log cache will be flushed to the Change Log disk (8).

1.3.3.4 Committing a Transaction

In addition, the DBMS is aware of transactions. It knows which changes belong to which transactions and whether those changes were successful. When the application requests the Transaction Manager (9) to commit a transaction (10), the Transaction Manager will ask the DBMS if it is ready to commit the transaction (11). The DBMS knows which disk volumes were party to the transaction (these are the transaction's resources described earlier in Section 1.2.2, "Transaction Manager").

The DBMS will query each disk volume that was involved in or was a resource to the transaction to determine if it was successful at executing all of the transaction's operations directed to it. If all changes were successfully applied, the DBMS will respond positively (12) to the Transaction Manager. If all other resources (if any) also respond positively, the Transaction Manager will inform the DBMS to commit the transaction (13). The Transaction Manager will then inform the application that the transaction was committed (14).

When told to commit the transaction, the DBMS will flush to the Change Log the Change Log caches of all disk volumes involved in the transaction. It will also write a commit token for the transaction into the Change Log.

If any resource votes "no," the Transaction Manager will tell the DBMS to abort the transaction. The DBMS will flush all involved Change Log caches to the Change Log and will write an abort token into the Change Log.

Flushing all changes to the Change Log at commit/abort time ensures that the transaction can be recovered if there is a system failure. The Change Log flush operation typically implements the durability attribute of transactions (see Section 1.2.1, "The ACID Properties of Transactions").

The distribution of transaction changes among multiple disk volumes or more specifically multiple Change Log caches creates a problem for a data replication engine at the target system. The flushing of the Change Log caches to the Change Log may not necessarily store the changes in the Change Log in the same order as they were applied. This may pose challenges for data replication at the target system, as described later.

1.3.4 Cross-Transaction Parallelism

Another source of challenges for data replication is cross-transaction parallelism. Two independent transactions may be simultaneously executing. As long as they are not changing a common row or rows, they may proceed independently of each other. However, one transaction may make a change which will result in a relational constraint violation for the other transaction if the transactions are executed out of order.

For instance, one transaction may delete a row with a unique alternate key value of "1" and the other transaction may subsequently insert a row with a unique alternate key value of "1." If the changes made by the two independent transactions are reversed in the Change Log, the insert will fail; but the delete will succeed. The result is that there will be no row with a unique alternate key value of "1."

1.3.5 Heterogeneous Data Replication

In some data replication environments, the target database has a different structure from the source database. Or, even if the database structure remains the same, the target database may have different relational constraints. In the preferred embodiment, the replication engine will make appropriate adjustments to the stream of database changes to ensure that the replicated data is formatted properly and that the replication constraints at the target database are satisfied.

1.4 Reversing Changes

Though not caused by partitioning, another relational constraint data conflict that must be handled similarly to relational constraint violations is that of reversing changes. A reversing change is an undo operation that reverses a prior failed change on the source system, and is incorporated into the present invention's definition of a relational constraint violation.

Consider a table in which the rows have a unique alternate key. Two rows in this table are represented below:

[P1, 1, 6]
[P1, 2, 8]

The rows have primary keys of 1 and 2 and unique alternate keys of 6 and 8, respectively. The application attempts to insert a new row [P1, 3, 8]. This insert may be entered into the Change Log, but it will fail when executed at the source system because of a duplicate unique alternate key. To prevent the failed change from being executed on a replay, a reversing delete may be inserted into the Change Log by the source system following the failed change. If this occurs, the Change Log will contain the following operations as a result:

I(P1, 3, 8)
RD(P1, 3, 8)

Similarly, if the application attempts to change the unique alternate key in the row [P1, 1, 6] to a value of 8, the change will fail due to a duplicate unique alternate key error. The change log will then contain a reversing update:

U(P1, 1, 8)
RU(P1, 1, 6)

If an application attempts to delete a parent row that still has a child row, a reversing insert will be inserted into the change log:

D(P1,1) A parent row with a child
RI(P1,1)

These reversing sequences typically will be replicated to the target system in proper order (they affect the same partition, and typically the same record or row in that partition). The target system must be able to handle them correctly. It must recognize the reversing sequences and take appropriate action, such as discarding both the original and the reversing event.

1.5 Automatic Transaction Facilities (ATF)

1.5.1 Introduction: ATF Background

Not all applications are written to utilize the benefits of transaction semantics as described above. That is, they perform database operations (data changes) outside the context of a transaction, and those changes do not exhibit ACID properties (they are not all performed atomically, as a unit, they are immediately visible to other applications (not isolated), they may result in database inconsistencies or other problems). Such database changes are known as, "non-audited" (the data changes are not written to a transaction log, or audit trail, for the purposes of enforcing transaction semantics and recovery). These applications may sometimes instead use some other mechanism (for example application logging or journaling) to try to avoid some of the issues when using non-audited data. For some applications where the data being manipulated is of low value and thus not requiring full transaction protection, this is reasonable. It may also be that the overhead which was presumed to arise from the use of transactions was not deemed acceptable. Over time however things change (for example the value of data increases, and/or the overhead of the use of transactions diminishes), and the original level of data protection utilized is no longer sufficient—the use of full ACID transaction semantics then becomes necessary. Very often this change is required to be accomplished without making any changes to the application itself (it may be that the original application source code is no longer even accessible). In such cases, software solutions known as "Automatic Transaction Facilities" (ATF) may be employed to provide transaction semantics automatically to an existing non-audited application, without requiring any changes to the application.

The following sections elaborate on these concepts to discuss the inherent issues with non-audited database operations, alternate (non-transactional) methods of data protection, and ATF solutions.

1.5.2 Non-audited Database Problem

Some database tables are non-audited, so whenever an I/O operation is performed against such tables, no record is kept of the changes that were made in a transaction log or audit trail (the main record being the values stored in those tables in the database itself). This is all well and good when the database operations complete successfully, but not when errors or failures occur. Some such circumstances (for example a process, processor, disk or system failure) may occur without any notification to the application program, which cannot therefore perform any compensating actions in order to recover from the failure (e.g. to repeat the operations which were in progress, or to log and notify an operator that an error has occurred). This is especially likely if a data change requires multiple database operations, and/or is split across several applications or sub-routines. Without the use of transactions, recovery from failures in such circumstances is complex and error-prone, and is very likely to leave the database in an inconsistent state (did all of the operations complete, some of them, none of them?). As said above, for some applications this may not matter, but for others (probably the majority in a mission critical enterprise) it matters a great deal.

Consider for example an application which prints bank checks, such an application will make changes to accounts in the database debiting the accounts, print the check and write a confirmation that the check has been printed. But suppose an error occurs such that the check is printed but the application fails before the account information is updated, or the account information is updated and the check fails to print. Without the use of transactions or some other form of logging, there is no record of what has been done (or not done), and an inconsistent application and database state is the result. If transaction semantics had been employed for such an application, then all of the steps in the process (the "business transaction") would be encapsulated within a single transaction context, and none of them would be made permanent until the transaction was committed. Had any error occurred during the application process, the transaction would be automatically aborted and none of the operations would have been executed. This includes even a total system failure, where upon recovery the transaction manager would resolve any outstanding transactions. By the use of transactions, the number of possible outcomes is reduced from many unknown states in the case of non-audited applications, to two known states (either all components of the transaction completed or none of them did). Application recovery is thus greatly simplified when transaction semantics are used, because either all of the work completed (in which case no further action is required), or none of it did (in which case it's a simple matter to just re-execute the whole transaction). In the non-audited case, in the event of errors, there is no persistent knowledge of exactly what was done and what wasn't, and hence what should be done to recover the situation.

1.5.3 Methods used to handle Non Audited Data

Rather than using transaction manager software and transaction semantics, other methods of applying "transactionality" to an application to help prevent data and state inconsistencies and facilitate recovery are sometimes used. These alternate approaches do not provide the same levels of protection as does the use of full ACID semantics, and also introduce other problems. These alternatives are further discussed in this section.

1.5.4 Application Logging

Application logging is a method used by the application itself to essentially manage its own "audit trail" of operations (also known as a "journal," or "application log"). Every data I/O operation performed by the application is also written to the journal. As well as including details about the actual data changes, such journal entries may also include application state commentary such as, "about to execute operation x", and "operation x completed", etc. In this way, in the event of a failure there is a persistent source of information about the state of the application and its database operations at the time of the failure.

However, the performance of this solution will be significantly impacted by the fact that two (or more if additional application state information is written) database I/Os must be performed for every one operation (one to update the actual database plus one (or more) to the journal). While it is true that the use of transactions also requires additional I/Os to be written to the audit-trail, these I/Os are highly optimized with such things as boxcarring and caching (with no data loss), which is far more efficient and performant than every application writing additional information to a journal. This method of application logging also suffers from similar potential database inconsistency issues as in the case where no journaling is performed (it is just as possible for one or more of the journal I/Os to fail, leaving the journal record inconsistent with what was actually done to the actual file or table). For example, if the, "operation x completed", message is absent from the log, this does not guarantee that operation x was not, in fact, completed. Similarly this will result in difficulty recovering from any failures since the journal may be incomplete and the actual state of the application and database is unknown. Also, if it was not included from the outset, the application will have to be rewritten to include the journaling functionality, which may be difficult or even impossible if the application is no longer accessible. If the journal operations are not flushed to disk or otherwise made persistent while they are being created, the journal entries themselves may be lost if a process, cpu, or other failure occurs. Flushing these entries to disk often can significantly impact the performance of the application and system.

1.5.5 Database Triggers

This mechanism is a variant on application logging as discussed above, the major difference being that the application itself does not have to be rewritten to perform the journaling. Database triggers are a mechanism provided by most enterprise database management subsystems (DBMS), in which user-written functions are automatically executed (triggered) upon the event of a database update to certain database tables (different tables can have different trigger functions associated with them, or none at all). When the non-audited application performs I/O on a database table with a trigger function associated with it, the trigger function is automatically executed. In this case, the trigger function is written to perform the same actions as for the application logging case. i.e. to write details about the data changes and application state, etc, to persistent storage, which can be used to facilitate recovery in the event of a failure of the application which performed the database change which triggered the function.

While solving the need to rewrite the application to perform the logging, in all other respects the database trigger approach suffers from all of the same issues as application logging (poor performance, possibility of errors resulting in database inconsistency, etc). It also suffers from an additional problem, the database triggers must be enabled each time the DBMS is started. If this step is omitted, then none of the trigger functions will be executed, and no logging of application activity will occur. There will also be no notification of this situation to the application, which will continue execution, compounding the database inconsistencies. Hence the database trigger approach is unreliable.

1.5.6 Intercept Libraries

This technique is a variant of the database trigger approach inasmuch that no changes are required to the application itself. Rather than effectively "inserting" logic into the application flow via a database trigger function, the intercept approach achieves the same end by intercepting (or "hijacking") the existing procedure calls used by the application to perform database operations (e.g. database provided SQL functions, or operating system provided I/O functions (Read, Write, etc)). Rather than the default functions, customized versions of them are developed and linked or bound with the application. The customized function versions maintain exactly the same name and syntax as the default versions, so no changes are required to the application. When the application calls these default functions, the customized version is now executed instead. The customized function is written to perform the required journaling of application activity (as previously discussed), before then calling the default function to actually perform the required database operation.

Again, while solving the need to rewrite the application to perform the logging, in all other respects the intercept library approach suffers from all of the same issues as previously discussed with application logging (poor performance, possibility of errors resulting in database inconsistency, etc). In addition, it is necessary to identify all of the database I/O function calls made by the application, for all of the applications concerned, to ensure that customized versions of these functions are developed and linked to all of these applications via the intercept library. It is very easy to miss some functions, and if the application source code is not available, it may not even be possible to identify all of the function calls made which need to be intercepted. If some function calls are missed, there will be no notification of this situation to the application, which will continue execution, compounding the database inconsistencies. Hence the intercept library approach is unreliable.

There is an additional consideration which applies to non-audited applications using any of the aforementioned logging methods. For any mission-critical application, business continuity is a prime concern. That is, the ability of the application services to be able to survive any IT outage situation (be it a power outage, system failure, flood, earthquake, terror attack, etc). This is typically achieved in part by having a standby, or backup, system available in a geographically separate location. The backup system is kept current with the active, or primary, system state by various means, such that it is ready to take over should the primary system become unavailable. One critical component of this is the need to keep the backup database synchronized with the current state of the active database. In a mission critical environment this is typically done by using an online data replication solution. Such solutions monitor changes made to the active database in real-time, and replicate the changes to the backup database, keeping the two synchronized. When audited data is being used, this process usually involves the data replication software reading the active system audit-trail (which is a reliable source of all changes actually committed to the database), and sending the changes logged there to the backup system for replay, often using the same transactional semantics as were used on the source (e.g. BEGIN WORK thru to COMMIT WORK for SQL environments)—keeping the two databases consistent. When some form of application logging is being used instead of a transactional audit trail, the source of the change data must be correctly configured to the data replication software so the changes can be read. It is however very easy to miss individual files, rows, or even entire tables when defining this information. When this omission happens, the source application continues making data changes that are not collected and replicated to the backup database and the backup database becomes inconsistent with the primary database. That is, even if no errors occur on the primary system and all application database operations are processed correctly, the active database and the backup database can become inconsistent with one another because not all of the data changes being made on the source system are being replicated to the backup system. Then, when the need for a failover arises and the backup system is made to be the active system, further processing will occur based on an incorrect database, resulting in ever increasing divergence with the correct database state. Worse, this divergence is not easily detected, and may never be detected if the original database is completely destroyed or otherwise inaccessible after the failover.

1.5.7 Automatic Transaction Facilities

All of the issues with the use of non-audited data and alternate methods of logging of data changes begs the question, why not always use audited data and transaction semantics in order to avoid these kinds of data and state consistency issues? The main reason for this is historical—in the early days, transaction manager software of the time was somewhat inefficient, and the use of transactions by applications incurred significant overhead. For many applications this overhead was deemed unacceptably high, and so transaction semantics were not used. Over time however, optimizations have been implemented in transaction management software to improve performance. For example:

Database disk processes can eliminate physical I/O operations by caching, with no possibility of data loss— when a system fails, updates in the audit trail are reapplied instead of being lost.

Audit records sent from the database disk process to the audit trail disk process are blocked together, using a technique called boxcarring—fewer messages can efficiently represent a large number of transactions.

Audit trail writes are also boxcarred—audit for many transactions from many disks is collected and written to the end of the audit trail with a single I/O.

Transaction management software can be massively scaled using many parallel audit trails (e.g. master and auxiliary audit trails).

Current hardware technology with multi-cored processors is orders of magnitude faster at lower cost than older platforms.

These enhancements have effectively eliminated most concerns about poor performance when using transaction semantics. To prove the point, a performance analysis was undertaken, (see "Best Practices: Using TMF to Implement Business Continuity/Disaster Recovery," by Richard Carr, Carr Scott Software Inc. *The Connection*, September-October 2013, Volume 34, No. 5.), comparing the transaction rates and response times for a sample application using audited and non-audited files. In this analysis, the absolute best transaction rate that could be achieved using non-audited files was 960 transactions per second (TPS), whereas using audited files reached 2,450 TPS. Note that this best non-audited transaction rate was achieved when using a technique called "database buffering", which comes at the cost of possible data loss in the event of a failure—something which is not possible when using audited files (had buffering not been used in order to reduce the possibility of data loss, the result would have been even worse). The same result is true for transaction response times—for the same load on the system, when using unaudited files, the transaction response time was as much as 10× slower (>500 milliseconds) than when using audited files (<50 milliseconds). Also, for this analysis there was no form of logging being performed for the non-audited case; had there been, then the additional overhead from that process would have made the performance when using non-audited data even worse.

For many applications however, these enhancements to transaction management software came too late, and they were written to use non-audited data. Now, despite all of the benefits offered by their use, it may not be feasible, or simply impossible, to update an existing non-audited application to use transaction semantics. This is where a class of software products known as Automatic Transaction Facilities (ATF) come in. Such Automatic Transaction Facility products are able to apply transaction semantics to an existing non-audited application with no changes required to the application.

The general characteristics of ATF software are as follows:

External configuration parameters which define for which database files and tables automatic transactions are to be executed, and transaction characteristics such as whether automatic transactions should span multiple files and tables or be exclusive to a particular file or table, isolation properties, etc.

Intercept library technology whereby the ATF software is linked with the application program and intercepts all procedure calls used by the application to perform database operations. Note: ATF intercept libraries do not suffer from the same issue discussed in section 1.5.5 (the possibility of missing some relevant database I/O function calls), since ATFs are written for specific database and operating system environments, thereby limiting the calls to be intercepted to a known subset (which is the same for all applications being addressed by the ATF software).

Interaction of the intercept library with the underlying operating system (O/S), DBMS, and transaction manager subsystems to call the appropriate transaction functions as provided by the transaction manager, and the database operations as provided by the O/S and/or DBMS—thereby enabling the ATF software to execute the intercepted database operations in the context of transactions as defined via the ATF configuration parameters.

An example of an ATF is the software product, "AutoTMF", by Carr Scott Software, Inc. Transaction Manager Facility (TMF) is the transaction manager subsystem found on HPE NonStop Server platforms, hence the name, "AutoTMF". The HPE NonStop Server is one of the pre-eminent mission-critical transaction processing platforms in the industry, and TMF is a long-standing and highly evolved component of that platform. AutoTMF uses the services provided by TMF to enable automatic transactions for applications running on the HPE NonStop Server platform. Such applications make use of the Enscribe file system and SQL/MP and SQL/MX relational databases for their persistent data storage. The files and tables for which automatic transactions are required are configured in AutoTMF, along with the properties of automatic transactions to be performed for those files/tables. The non-audited application is linked with the AutoTMF intercept library. When the application executes a relevant database function, the AutoTMF intercept library version of that function is executed instead. This function checks with the AutoTMF configuration information (for example, whether the operation is intended for a file or table which is configured for automatic transactions), and dependent upon this information, the database operation being performed, and the current state of any currently in-process automatic transaction, makes the appropriate TMF function call (for example, to BEGIN, COMMIT or RESUME a transaction). The AutoTMF intercept library then issues the database function as originally called by the application, and returns control to the application with the results of that operation. In this way, AutoTMF enables non-audited applications running on the HPE NonStop Server platform to derive transactional characteristics for operations performed on either Enscribe, SQL/MP or SQL/MX databases, with no changes being required to be made to the application. More details about the concepts behind the AutoTMF product can be found in U.S. Pat. No. 7,246,123 (Carr et al.) entitled "Automatic Transaction Management."

Another example of an ATF software product is the "TMF-Audit Toolkit", from TANDsoft Inc. (https://tandsoft.com/files/products/TMF-Audit-Toolkit.html, accessed Apr. 28, 2021). This software works in exactly the same way as AutoTMF, by intercepting database function calls made by the application and bracketing them with automatic transactions as configured by the user.

Despite the benefits of using transaction semantics, the fact that performance issues pertaining to their use have been largely eliminated (most applications will actually see improved performance), and by the use of ATF software such semantics can be derived with no changes necessary to an existing non-audited application, there continue to be baseless issues raised against the use of transactions, for example:

Managing transactions does not introduce extra steps in the application workflow, and thus degrade performance.
1. If a non-audited data replication solution is being used, then every data change (insert, update, or delete) requires an extra application I/O to the data replication processes and/or log files. This step adds considerable overhead to the non-audited file I/O pathlength and latency, and significantly degrades system and application performance (more so than any additional overhead introduced by an ATF).
2. Using an ATF intercept method does not add any more overhead than using other intercept methods to log non-audited I/O data changes.
3. When any part of a non-audited data replication intercept or solution fails, it may negatively impact the source application's processing, even preventing it from running. This issue is not the case when an ATF is used, the replication software is a completely separate component from the application and transaction management subsystem, and a failure of any part of the replication software does not directly impact the application's processing.

Using an ATF cannot lose data that needs to be replicated.
1. When a user-written I/O intercept mechanism is being used to log data changes for non-audited data, it is very easy to miss individual files, rows, or even entire tables when adding the intercept library to new applications or performing application updates.
2. The extra steps required to save non-audited I/O into a replication solution's log files are fraught with additional failure modes, possibly leading to data loss when failures occur (e.g. certain application failures, I/O cancellations, replication process failures, CPU failures, even system failures and restarts).

Use of an ATF and transactions does not require more disk space and retention for the audit trails.
1. Regardless of the collection method used, sufficient (and persistent) disk space must be allocated to log the change data that needs to be replicated to the target system, and the log files that hold the change data need to remain available until that data is replicated successfully. The audit trail requirements to satisfy this need when using an ATF should not be substantially different from the disk needs required by the non-audited solution.

Use of an ATF and transactions preserves database consistency.
1. Without the use of transaction semantics, applications may make data changes that are not fully completed, especially if a data change requires multiple database operations, and/or is split across several applications or sub-routines. Recovery from failures in such circumstances is complex and error-prone, and is very likely to leave the database in an inconsistent state (which can be very costly). By using an ATF and audited data, data integrity, data consistency, and error recovery is completely handled by the transaction manager; either all of the database operations complete or none of them do, always leaving the database in a consistent state. Using an ATF also avoids the possibility of a base file becoming inconsistent with its alternate key file or index—this possibility can (and does) arise for non-audited files and tables.
2. There are several error scenarios discussed above whereby a non-audited application will continue processing even though the journaling method being used is not operating correctly (for example, by forgetting to enable database triggers). In the event of a failure such a situation will result in an inability to fully recover (since there is no log information to recover from), resulting in an incorrect database. This scenario cannot arise when using an ATF since if a database operation is executed against an audited file or table, and the ATF has not been correctly configured and started, no transaction will be in effect and the operation will consequently fail (as will any such subsequent database operation). i.e. the application cannot "blindly" proceed with database changes on the assumption that all such changes are being logged, as is true in the non-audited case.

And, there are other less immediately tangible benefits of using an ATF with audited data:

Newer and younger management teams tend to view a non-audited application and database that cannot maintain (or guarantee) data integrity and consistency as "antiquated" or "legacy"—out of touch with current best-practices for relational database management systems (RDBMS).

Future technical improvements in data protection often require auditing to be in place in order to leverage these advanced capabilities. For example, new zero data loss (ZDL) data replication technology—this technology ensures that customers' data changes are safe-stored on a target system before the source data changes are allowed to commit. Any subsequent failure of the source system will not lose any critical data, regardless of the type of failure that occurs at the source system, datacenter, or communications network. This additional capability is simply not available without the use of transactional data change auditing.

Far from being an impediment, use of an ATF and audited data not only offers significant operational, reliability, and data integrity advantages, it also improves overall system performance and can lead to improved capacity utilization. The migration from a non-audited to an audited application is very simply made using the facilities provided by an ATF, and introduces no significant overhead. In summary:

- The use of an ATF does not impact performance; in fact, in most cases it dramatically improves it.
- The use of an ATF does not require an application rewrite, nor typically any application modifications at all.
- The use of an ATF ensures database consistency and brings an unaudited database up-to-date to the best practices available for DBMS data management.
- The use of an ATF helps to guarantee, in a replication environment, that the target database can receive all of the database changes made at the source, to keep it complete, accurate, and consistent.
- The use of an ATF helps to future-proof applications, enabling the exploitation of new capabilities (such as zero data loss data replication).

1.6 What is Needed

As discussed in section 1.5 above, the use of transaction semantics and an ATF confers many benefits to non-audited applications without the need to make any application modifications, and without incurring any significant overhead. However, use of an ATF may change the externally observed behavior of a non-audited application, which can lead to data loss in the event of certain failure scenarios.

When a non-audited application makes data changes, those changes are immediately applied to the database and made visible to this or any other application accessing the same files or tables (there is no isolation of the change data). However, when an ATF is involved, data changes are only applied and made visible when the transaction in whose context the changes are executed is committed. Normally when error situations arise the ATF will gracefully handle them and commit all in-flight (started but not yet committed) transactions, so no data is lost. However, there are some circumstances, such as executing an O/S command to force stop an application process, or failure of the CPU in which the application process is running, which will immediately halt the application process (and thereby also the ATF intercept library), without any opportunity to perform error handling. In these cases, since the data changes have not yet been committed, any in-flight transactions and the data changes associated with them will be lost because they are auto-aborted and rolled back. This unintended transaction rollback behavior differs from that which would be observed with the original non-audited application in the same situation (where the data changes would have been immediately made manifest), and could lead to data inconsistencies, data loss, and incorrect results. This situation would not arise had the application been written from the outset to explicitly use transaction semantics, since these error situations would have been accommodated for in the application design (for example, to recover and re-execute the failed transactions). While it is possible to configure an ATF to commit the transaction immediately after every data change so that no data loss would occur, this would lead to very poor performance and is not a realistic solution.

Since the use of transaction semantics is very beneficial, any obstacles to the use of an ATF, such as unintended transaction rollbacks, are significant, and should be addressed if technically feasible. What is needed in this case are methods to resolve ATF error situations which may lead to data loss, such that no data loss occurs.

BRIEF SUMMARY OF THE INVENTION

2 Brief Summary

When an ATF is involved, data changes are only applied and made visible when the transaction in whose context the changes are executed is committed. Normally when error situations arise the ATF will gracefully handle them and commit all in-flight (started but not yet committed) transactions, so no data is lost. This behavior closely matches what would be the database result for the unaudited database case. However, there are some circumstances, such as executing an O/S command to force stop an application process, or failure of the CPU in which the application process is running, which will immediately halt the application process (and thereby also the ATF intercept library which is typically used with an ATF), without any opportunity to perform error handling. In these cases, since the data changes have not yet been committed, any in-flight transactions and the data changes associated with them will be lost because such failure will typically lead to those transactions being aborted by the DBMS, thereby backing out (removing) the database changes. This is referred to herein as an unintended transaction rollback.

The present invention includes an ATF Recovery Engine which is configured to monitor (e.g. watch, poll, or wait) created database transactions for Transaction Termination Directives from the Transaction Manager or other Subsystem. It then monitors for registered termination directives happening on the system. Notice of these monitored directives can be sent or received, for example, by signals, alerts, IPC messages, or another operating system facility. If a directive is detected or received and is an unintended transaction termination (e.g. an abnormal abort), the ATF Recovery Engine (or tools/utilities it launches, signals or invokes) repairs the database so that rolled back data steps and operations are made durable according to the ACID database principles.

In another embodiment of the present invention an ATF Recovery Engine is configured to read the audit trails of the system as the method by which it monitors the created database transactions to detect transaction rollbacks. If an Abnormal Transaction Termination Directive is read from an audit trail, a decision is made if the directive requires intervention to repair the database (e.g. if it is an Abort Work on an originally non-audited table that was made audited through the use of an ATF). If so, the ATF Recovery Engine, or a tool/utility it launches, signals or invokes, reapplies the steps or operations from the audit trail and commits the updates.

3 Definitions

The following definitions describe the use of certain terms in this specification. They are hierarchically ordered in that each definition builds on previous definitions.

Data Manipulation Language (DML)—The steps or operations (events) that control a database's contents, such as insert, update, delete, and read a row or record.

Data Definition Language (DDL)—The steps or operations (events) that control a database's structure, such as add or delete a column or a table.

Database Management System (DBMS)—A system that manages a database by controlling the structure of the database and by executing commands against the database, such as inserting data into files or tables.

Change Log—a record of all (or important) changes made to a database. A transaction log or audit trail is an example of a change log.

Application—One or more processes cooperating to perform a useful function or service.

Operating System—A software facility that manages computer hardware resources and provides common services for application processes. Typical services include time functions, reading and writing inter-process (IPC) messages, alerts, signals, and database manipulation.

Transaction (a database transaction)—A delimited set of database steps or operations (inserts, updates, deletes, reads) that are either all made or none are made. A transaction is guaranteed to leave the database in a persistent, consistent, and correct state; and its results are typically guaranteed to survive system failures.

ACID Properties—Transactions maintain the ACID properties of atomicity, consistency, isolation, and durability. Atomicity means that either all operations contained within the transaction are executed against the database or that none are. Consistency means that at any time, the view of the database represents an accurate view of the application data. Isolation means that a transaction is unaffected by other transactions that are executing simultaneously. Durability means that the resulting modification to the database by a transaction will survive any subsequent system failures. In some implementations, the ACID properties may be relaxed.

Atomicity—See ACID Properties.

Begin Transaction—A directive/operation that indicates the beginning of a transaction. A begin transaction directive may be explicit, or it may be implicit with the first database operation for a transaction.

Begin Work—Equivalent to Begin Transaction.

Commit Transaction— A transaction termination directive/operation that indicates that a transaction has successfully completed and should be made durable.

Commit Work/Commit—Equivalent to Commit Transaction.

Abort Transaction/Abort Work/Rollback—A transaction termination directive/operation that indicates that a transaction is unsuccessful and should be undone, i.e. rolled back, with no effect on the database.

Rollback Work—Equivalent to Abort Transaction/Abort Work.

Transaction Directive or Action—A transaction command or action such as Begin Transaction, Abort Transaction, or Commit Transaction.

Abnormal Transaction Termination—A transaction that is aborted by some system or facility other than at the direction of the application specifically calling Abort Work, e.g. such as when a CPU which was running the application or ATF facility crashes. An abnormal transaction termination might also happen because an external process terminated the application, or a timeout on a Commit Work timer occurs. In systems where multithreaded parallelism is in operation on audited databases with foreign keys, deadlocks may require remediation including abnormal transaction termination to free up application processing.

Unintended Transaction Rollback—A transaction rollback that is a result of an abnormal transaction termination caused by an automatic transaction facility's failure to convert an abnormal transaction termination to a commit.

Abnormal Transaction Termination Directive—A transaction directive which corresponds to an abnormal transaction termination. Typically, this directive would be an Abort Transaction or Rollback Work directive which might be read from an audit trail or transaction log for the case where the user's application did not call that transaction directive.

Transaction Manager—A facility for managing the updating of a database by applying transactions to it. A transaction manager ensures that changes to a database maintain the ACID properties.

BRIEF DESCRIPTION OF DRAWINGS

4 Drawings

FIG. 1 shows a prior-art architecture of a computer application.

FIG. 2 shows a prior-art Transaction Manager and its processing of transactions.

FIG. 3 shows a prior-art table partitioned among multiple disk volumes and managed by a DBMS.

FIG. 4 shows a prior-art implementation of a multi-threaded DBMS.

FIG. 5 shows a preferred embodiment of the present invention where an ATF Recovery Engine which watches or waits for abnormal transaction terminations.

FIG. 6 shows a preferred embodiment of the present invention where the ATF Recovery Engine which read audit trails.

FIG. 7 shows a preferred embodiment of the present invention where an ATF Recovery Engine waits for alerts/notifications and re-applies aborted transaction data (i.e. transaction operations and/or steps).

FIG. 8 shows a transaction processing system which includes an ATF Recovery Engine.

DETAILED DESCRIPTION OF THE INVENTION

5 Detailed Description

Certain terminology is used herein for convenience only and is not to be taken as a limitation on the present invention.

The words "a" and "an", as used in the claims and in the corresponding portions of the specification, mean "at least one."

A preferred method of operation of the present invention is as follows: First, a non-audited application, with an ATF facility for converting the non-audited application to use audited database transactions, creates database transactions against an audited database. The database transactions include one or more transaction steps or operations. The created database transactions are monitored to detect transaction rollbacks, and a determination is made regarding whether the detected transaction rollback for the database transaction is an unintended transaction rollback. The determining factor includes whether the unintended transaction rollback is the result of a failure of the ATF facility to convert the unintended transaction rollback to a commit operation. Finally, the one or more transaction steps or operations of the database transaction that included the unintended transaction rollback are recovered in the audited database, thus resolving the unintended transaction rollback.

The ATF failure problem and preferred embodiments of the present invention are further described in subsequent sections.

5.1 ATF Failure Problem and Recovery

In order to illustrate the nature of the ATF failure problem causing abnormal/unintended transaction terminations requiring recovery, a series of examples are given. Table 1 shows in the left-hand column the original state of a non-audited database. The middle column shows example DML (or DDL) operations that can be applied to the database. The right-hand column shows the after-effects of the DML operations (or remediation) being applied to the database.

TABLE 1

Non-Audited Application Crashes

| ORIGINAL DATABASE STATE | APPLICATION DML OPERATIONS | CURRENT DATABASE STATE |
|---|---|---|
| <No Row1> <No Row2> Old Row3 Old Row4 <No Row5> | | |
| | Insert Row1 Insert Row2 Update Row3 Delete Row4 Insert Row5 | |
| | | New Row1 New Row3 New Row2 <No Row4> New Row5 |
| | <Application crashes> | |
| | | Database stays current (no rows database affected) in |

Specifically, the database starts with only two old rows (Row3 and Row4) in it. An application runs (Column 2) and inserts two rows (Row1 and Row2), Updates Row3, Deletes Row4, and Inserts Row5. If the application crashes, e.g. due to a programming bug, at this point, nothing happens to the database and the database has the four new rows present.

In contrast to the non-audited application and database, Table 2 shows what happens in the case of an audited database when the application crashes.

TABLE 2

Audited Database Application Crashes

| ORIGINAL DATABASE STATE | APPLICATION DML OPERATIONS | CURRENT DATABASE STATE |
|---|---|---|
| | BEGIN WORK | |
| <No Row1> <No Row2> Old Row3 Old Row4 <No Row5> | | |
| | Insert Row1 Insert Row2 Update Row3 Delete Row4 Insert Row5 | |
| | | New Row1 New Row2 New Row3 <No Row4> New Row5 |
| | <Application crashes> Transaction Auto-aborts | Application DML operations are reverted to Original State: |

TABLE 2-continued

Audited Database Application Crashes

| ORIGINAL DATABASE STATE | APPLICATION DML OPERATIONS | CURRENT DATABASE STATE |
|---|---|---|
| | | <No Row1> <No Row2> Old Row3 Old Row4 <No Row5> |

Shown in the table after the application crashes is an Abort Work/Rollback which is automatically applied to the database by the TMF or other subsystem to revert the database back to the original database state. Database updates by the application are no longer visible.

If however, a non-audited application is protected by an ATF and crashes, then shown in Table 3 is the result.

TABLE 3

ATF Protected Non-Audited Application Fails or Crashes

| ORIGINAL DATABASE STATE | APPLICATION DML OPERATIONS | CURRENT DATABASE STATE |
|---|---|---|
| | ATF intercept does a BEGIN WORK | |
| <No Row1> <No Row2> Old Row3 Old Row4 <No Row5> | | |
| | Insert Row1 Insert Row2 Update Row3 Delete Row4 Insert Row5 | |
| | | New Row1 New Row2 New Row3 <No Row4> New Row5 |
| | <Application crashes> Transaction begins to Auto-aborts ROLLBACK is intercepted by ATF and converted to COMMIT WORK. Application DML operations are NOT reverted to Original State. | |
| | | New Row1 New Row2 New Row3 <No Row4> New Row5 |

The same auto-abort is initiated, but in this case it is intercepted by the ATF and converted to a COMMIT WORK. The database is NOT reverted to the original database state. This is desirable for non-audited applications to be able to gain the advantages of transaction processing yet operate consistently with the way they operated before use of the ATF.

However, if the ATF itself crashes or is unable to complete its function for some reason, Table 4 illustrates how the present invention operates.

TABLE 4

ATF Fails for ATF Protected Application,
ATF Recovery Engine Repairs Damage

| ORIGINAL DATABASE STATE | APPLICATION DML OPERATIONS | CURRENT DATABASE STATE |
|---|---|---|
| <No Row1><br><No Row2><br>Old Row3<br>Old Row4<br><No Row5> | ATF intercept does a BEGIN WORK | |
| | Insert Row1<br>Insert Row2<br>Update Row3<br>Delete Row4<br>Insert Row5 | |
| | | New Row1<br>New Row2<br>New Row3<br><No Row4><br>New Row5 |
| | <Application AND ATF both crash, e.g. from a CPU failure><br>Transaction Auto-aborts | Application DML operations are reverted to Original State:<br><No Row1><br><No Row2><br>Old Row3<br>Old Row4<br><No Row5> |
| | 1. ATF RECOVERY ENGINE ALERTED OR NOTICES PROBLEM WITH PROTECTED DATABASE<br>2. ATF RECOVERY ENGINE READS AUDIT LOGS AND DETERMINES IT WAS AN ABNORMAL TRANSACTION TERMINATION THAT IS UNINTENDED<br>3. ATF RECOVERY ENGINE DOES BEGIN WORK THEN REAPPLIES APPLICATION DML OPERATIONS, CALLS READ FROM AUDIT TRAIL THEN CALLS COMMIT WORK | RESULT: Database reverted to correct updated state:<br>New Row1<br>New Row2<br>New Row3<br><No Row4><br>New Row5 |

In this example, the auto-abort/ROLLBACK WORK is not intercepted or handled by the ATF and the result is that the database changes are aborted and the database reverts to the original database state. At this point the present invention starts operation as follows:

1. The ATF Recovery Engine is alerted or notices a problem with an ATF Recovery Engine protected table or entire database.
2. The ATF Recovery Engine determines if it needs to take action, specifically because the ATF has failed because of an abnormal transaction termination that was unintended due to the ATF's inability to complete its proper function.
3. If the ATF Recovery Engine needs to act, either it, or a facility it starts or triggers, will begin a transaction (BEGIN WORK) and re-apply the necessary application DML operations to restore the proper current database state. Then a COMMIT WORK is performed to make the changes to the database durable.

Regarding Step 3 above, one tool or utility that is able to re-apply application DML operations read out of an audit trail is Shadowbase UNDO/REDO from Gravic, Inc., Malvern, Pa.

Preferred embodiments of the present invention are further described in the following sections.

5.2 ATF Recovery Engine Watches or Waits for Abnormal Termination

One preferred embodiment of the present invention includes an ATF Recovery Engine which is configured to monitor for Transaction Termination Directives from the Transaction Manager or other Sub-system. It then watches, polls, or waits for registered termination directives happening on the system. If a directive is detected or received and is an abnormal (e.g. abort) transaction termination, the ATF Recovery Engine uses tools to repair the database so that rolled back data steps and operations are recovered (reapplied) and made durable.

FIG. 5 shows a flowchart for this preferred embodiment. Specifically, step 5000 configures the ATF Recovery Engine to watch for, poll for, or wait to be notified about Transaction Termination Directives from the Transaction Manager or other Sub-system. Step 5100 encompasses the ATF Recovery Engine watching, polling, or waiting for abnormal transaction termination directives. When one is identified, it will continue to step 5200. If in step 5200, the directive requires intervention (i.e. those which caused unintended transaction rollbacks), then processing continues with step 5300. Otherwise, it will return to step 5100. In step 5300 the ATF Recovery Engine takes corrective action to fix the data associated with the abnormal transaction termination. Corrective actions can include reapplying or undoing transaction steps to minimize data loss and maintain consistency. Once the corrective actions have been taken, return to step 5100.

5.3 ATF Recovery Engine Reads Audit Trail

In another preferred embodiment of the present invention an ATF Recovery Engine is configured to read the audit trails of the system as the monitoring method. If an Abnormal Transaction Termination Directive is read from an audit trail, a decision is made if the directive requires intervention to repair the database. If so, the ATF Recovery Engine reapplies the steps or operations from the audit trail and commits the updates.

FIG. 6 shows a flowchart for this preferred embodiment. Specifically, step 6000 configures the ATF Recovery Engine to identify Abnormal Transaction Termination Directives which require intervention (i.e. those which caused unintended transaction rollbacks). This identification can involve transaction start, process start, signal from process or OS, process termination, DB file activity, and actions involving AutoTMF registered executables. In step 6100 the ATF Recovery Engine reads the audit trail, watching for Abnormal Transaction Termination Directives. Once one is found, processing continues at step 6200. For step 6200, if the transaction requires intervention, for example because it is an undesired or abnormal termination, abort, or auto abort associated with a specific process, then continue to step 6300. If the action does not require intervention, return to step 6100. For step 6300 the ATF Recovery Engine takes corrective action to fix the data associated with the transaction that required intervention. Corrective actions can include reapplying or undoing transaction steps to minimize data loss and maintain consistency. Once the corrective actions have been taken, return to step 6100.

5.4 ATF Recovery Engine Waits for Alerts and Re-Applies Aborted Data

In another preferred embodiment of the present invention an ATF Recovery Engine is configured to wait for alerts as the monitoring method. The ATF Recovery Engine registers to be alerted on transaction termination, and checks the audit trail entries associated with the alert to determine whether the terminated transaction requires intervention to repair the database. If so, the ATF Recovery Engine reapplies the steps or operations from the audit trail and commits the updates.

FIG. 7 shows a flowchart for this preferred embodiment. Specifically step 7000 configures the ATF Recovery Engine to identify transaction terminations which require intervention. This identification can involve transaction start, process start, signal from process or OS, process termination, DB file activity, and actions involving AutoTMF registered executables. For step 7010 the ATF Recovery Engine registers to be alerted on transaction termination. For step 7100 the ATF Recovery Engine waits to be notified of a transaction termination. Once one is identified, it will continue to step 7200. During step 7200, if the transaction requires intervention, for example because it is an undesired or unintended abnormal termination, abort, or auto abort associated with a specific process, then continue to step 7300. If the action does not require intervention, return to step 7100. For step 7300 the ATF Recovery Engine takes corrective action to fix the data associated with the transaction that required intervention. Corrective actions can include reapplying or undoing transaction steps to minimize data loss and maintain consistency. Once the corrective actions have been taken, return to step 7100.

5.5 System which Includes an ATF Recovery Engine

The system apparatus where the illustrated embodiments preferably execute consists of the following components:
8000 The System including the ATF Recovery Engine, containing one or more processors
8100 The Processor(s) running the ATF Recovery Engine and other system components
8110 The ATF Recovery Engine reads from the audit trail, receives notifications from TMF, and makes changes to the database when needed.
8111 The Application which makes changes to a database
8112 The ATF (e.g. AutoTMF) intercept library which interacts with TMF to form transactions around the changes the application makes to the database
8113 TMF records transaction information in the audit trail and notifies the ATF Recovery Engine of events.
8200 The Audit Trail Subsystem
8300 The Database Subsystem It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method of resolving an unintended transaction rollback in a system that includes (i) an audited database, (ii) a non-audited application, and (iii) a facility for converting non-audited applications to use audited database transactions, the method comprising:
    (a) operating the non-audited application with the facility creating database transactions against the audited database, the database transactions including one or more transaction steps or operations;
    (b) monitoring the created database transactions to detect transaction rollbacks;
    (c) determining when a detected transaction rollback for a database transaction is an unintended transaction rollback, wherein the unintended transaction rollback is the result of a failure of the facility to convert the unintended transaction rollback to a commit operation; and
    (d) recovering in the audited database the one or more transaction steps or operations of the database transaction that included the unintended transaction rollback, wherein the recovering resolves the unintended transaction rollback,
        wherein the recovering includes reapplying and committing the one or more transaction steps or operations of the database transaction that included the unintended transaction rollback.

2. The method of claim 1 wherein the monitoring occurs by using alerts.

3. The method of claim 2 wherein the alerts are operating system signals.

4. The method of claim 2 wherein the alerts are interprocess communications.

5. The method of claim 1 wherein the monitoring occurs by reading an audit trail of the audited database.

6. The method of claim 1 wherein the unintended transaction rollback is the result of a failure in a central processing unit (CPU) where the non-audited application is operating.

7. The method of claim 1 wherein the unintended transaction rollback is the result of a failure in a central processing unit (CPU) where the facility is operating.

8. The method of claim 1 wherein the unintended transaction rollback is the result of a failure in the facility.

9. The method of claim 1 wherein the facility is an intercept library.

* * * * *